US008509844B2

(12) United States Patent
Venkataramu (10) Patent No.: US 8,509,844 B2
(45) Date of Patent: *Aug. 13, 2013

(54) ENABLING PORTABILITY OF CREDENTIALS ACROSS DUAL MODE DEVICES

(75) Inventor: Praveen Venkataramu, Morris Plains, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,532

(22) Filed: Apr. 30, 2012

(65) Prior Publication Data

US 2012/0270524 A1    Oct. 25, 2012

Related U.S. Application Data

(63) Continuation of application No. 12/609,528, filed on Oct. 30, 2009, now Pat. No. 8,190,198.

(60) Provisional application No. 61/180,621, filed on May 22, 2009.

(51) Int. Cl.
*H04M 1/00* (2006.01)
*H04B 7/216* (2006.01)
*H04M 3/42* (2006.01)

(52) U.S. Cl.
USPC .................. 455/552.1; 455/415; 370/320

(58) Field of Classification Search
USPC ............. 455/552.1, 553.1, 333, 556.1, 343.3, 455/415, 127.4, 160.1; 370/320, 335, 342, 370/441
See application file for complete search history.

(56) References Cited

U.S. PATENT DOCUMENTS

| 7,603,120 | B2 * | 10/2009 | Rager et al. ............... 455/433 |
| 2002/0154632 | A1 | 10/2002 | Wang et al. |
| 2005/0282544 | A1 | 12/2005 | Oommen et al. |
| 2009/0149220 | A1 | 6/2009 | Camilleri et al. |

FOREIGN PATENT DOCUMENTS

EP    2 094 057 A2    8/2009
WO    WO 2008/129014 A2    10/2008

OTHER PUBLICATIONS

Entire Prosecution of U.S. Appl. No. 12/609,528, filed Oct. 30, 2009 to Venkataramu, filed Oct. 30, 2009, entitled, "Enabling Portability of Credentials Across Dual Mode Devices"

* cited by examiner

*Primary Examiner* — Eugene Yun (57) ABSTRACT

A method is presented for enabling a dual-mode mobile device to access different networks. Subscriber data used for access includes a device identifier for the device and a module identifier for a removable module coupled to the device. The device and removable module respectively have credentials for different types of networks. The device and module identifiers are associated with previously stored information for a subscriber account associated with the device. The device is authorized to access the first type of network based on the stored association and is granted authorization only when subscriber data received from the device for subsequent access requests includes module identifier information matching the module identifier stored in association with the device identifier.

20 Claims, 4 Drawing Sheets

5

| Account No. | Name | ICCID | IMEI/MEID | Status Flag stet=Provisioned | Provisioning info CDMA (PRL, NAI's, MON, MIN's) LTE (PLMN, MSISDN, etc.) |
|---|---|---|---|---|---|
| 007 | Zon | ICCID_007 | IMEI_007 | | |
| 009 | Solo | ICCID_009 | IMEI_009 | | |

| Account No. | Name | ICCID | IMEI/MEID | Status Flag stet=Provisioned | Provisioning info CDMA (PRL, NAI's, MON, MIN's) LTE (PLMN, MSISDN, etc.) |
|---|---|---|---|---|---|
| 007 | Zon | ICCID_007 | IMEI_007 | SET | Provisional CDMA |
| 009 | Solo | ICCID_009 | IMEI_009 | SET | Provisional CDMA |

ENABLING PORTABILITY OF CREDENTIALS ACROSS DUAL MODE DEVICES

RELATED APPLICATIONS

This application is a continuation and claims the benefit of U.S. application Ser. No. 12/609,528 filed on Oct. 30, 2009, and issued as U.S. Pat. No. 8,190,198 on May 29, 2012, which claims priority from U.S. Provisional Application No. 61/180,621 filed on May 22, 2009, the disclosures of which are incorporated herein by reference in their entirety.

BACKGROUND

In recent years, use of mobile communications devices for voice telephone services, email or text messaging services and even multi-media services has become commonplace, among mobile professionals and throughout the more general consumer population. Mobile service provided through public cellular or PCS (personal communication service) type networks, particularly for voice telephone service, has become virtually ubiquitous across much of the world. The rapid expansion of such mobile communication services has resulted in deployment of a variety of different and often incompatible wireless network technologies, in different jurisdictions or regions and in some cases as competing services within the same area. A large carrier may operate its network over a wide geographic area and have roaming agreements with operators of other compatible technology networks in other areas. However, occasions still arise in which a service technology of a home network may not be available in a visited area or region into which a customer roams and intends to use her mobile device. The service provider may utilize a different technology in a different area or country, or more often, networks of other operators in other region utilizing alternative technology. To allow continued operation in regions where the local provider offers service via a different technology, station manufactures have developed dual or multi mode mobile devices, which have the capability of communicating via two or more wireless mobile technologies.

Hence, global devices that use 3GPP2 type CDMA technologies (1XRTT and EVDO) are also required to operate in networks that support 3GPP technologies (GSM/UMTS/LTE). This is necessary because in many countries around the world CDMA is not deployed. One example would be European countries where a CDMA device would have no coverage at all. In addition, there are many countries, e.g., China and India, where both 3GPP2 and 3GPP based networks exist with extensive coverage.

To facilitate customer roaming where a particular operator may not have network coverage, the service provider or operator of one network will have agreements with other operators/service providers. Under such agreements, customers of the other operators may roam-in and use the one provider's network, whereas customers of the one provider may roam-out and use the networks of the other operators/service providers. As a result of the differences in network technologies and the availability of multimode mobile devices, there may be roaming agreements with operators providing the two different technologies.

3GPP variants of the mobile devices utilize a Subscriber Identity Module or "SIM" card (called UICC in the 3GPP standards documents—universal integrated circuit card). Such a case provides secure storage for various data needed for operation of a mobile station, such as data identifying the mobile device to the network (e.g. MDN and/or MIN). However, the SIM card is a standardized removable module that can be moved from one mobile device to another, to effectively move the subscriber identity from one device to another.

For a mobile device conforming to CDMA technology standard, the credentials of the subscriber traditionally are stored on the mobile device instead of on the SIM card. The CDMA variant of the mobile devices often use an R-UIM/CSIM which is an internal memory module of the mobile device to store various data needed for operation of the mobile device, such as data identifying the subscriber and the mobile device to the network (e.g. MDN, PRL, MIN, secure information). The concept of UICC cards were introduced at the very latest stage in the current development of CDMA technology. As such, many of the CDMA operators are still using models of the mobile devices without a UICC for CDMA.

With these operators moving to 3GPP technology, a UICC card is mandatory to access the network. Hence with dual mode (3GPP-CDMA) devices there are two options for accessing both CDMA and 3GPP technologies: (1) use the device UIM for CDMA access technologies credentials and UICC (e.g., SIM/USIM) for 3GPP access technologies credentials or (2) use removable UICC with R-UIM/CSIM in the device for CDMA and UICC card for 3GPP to access both the technologies. In the first scenario, the CDMA credential of the subscriber is stored in the memory (e.g., UIM) of the mobile device and the 3GPP credential of the subscriber is stored in the UICC card. This scenario may result in having two mobile devices with a single account. For example, a UICC card of a first mobile device may be inserted into a second mobile device. Inserting a UICC card of the first mobile device into the second mobile device will result in transfer of 3GPP credentials, which is stored in the UICC card, to the second mobile device. However, the CDMA credentials of the first mobile device, which is stored in the memory of the first mobile device, continues to remain on the first mobile device. The first mobile device has the otherwise valid credentials and is still operable at least in old CDMA technology networks. The second mobile device has the same credentials and fully operable in all network technologies.

As such, there occurs a fraud condition with the same active credential of a user on two different devices. That is, both the first and second mobile devices may be provisioned and used with the same phone number or the like without informing the network operator. For example, the first mobile device may work in the CDMA network and the second mobile device may work in the 3GPP network with the same number.

In the second scenario, the credentials of the subscriber are stored on two separate chips (e.g., UICC with CSIM in the device and UICC card). The UICC with CSIM stores CDMA credentials of the subscriber; whereas, the UICC card stores 3GPP credentials of the subscriber. As such, transferring both cards from one mobile device to another may result in full transfer of subscriber account from one device to another. That is, since the CDMA credentials are not stored on the device itself, when the SIM cards are transferred, so is the credentials of the subscriber. As such, the fraud situation described above may be avoided.

The problem with second solution, however, is that many CDMA operators are using model devices without a UICC card and, as such, the solution would not cover many mobile devices that do not have a UICC card and/or are not configured to receive a UICC card.

Hence, for mobile devices that store CDMA credential on the device itself, there is a need for additional security infrastructures to counter attack this fraud condition. In particular, there is a need for a method that minimizes the fraud condition and/or enhances user experience when switching from one dual mode CDMA-3GPP device to another.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one aspect, the instant application describes techniques that allow a true portability of credentials across dual-mode devices when dual-mode devices exchange their UICC with each other. That is, the instant application describes techniques that allow the subscriber account to follow the UICC card and stay within one device instead of staying within multiple devices. As such, the instant application can solve the problem associated with the prior art in which two mobile devices may become associated with one subscriber account.

The dual mode mobile devices are configured to operate in both CDMA network and 3GPP network. For the purposes of the description, the 3GPP network in this application is assumed to be an LTE network. However, one of ordinary skill in the art would recognize that the 3GPP network may include other types of network such as GSM/UMTS.

Once the UICC card is inserted in the mobile device, the mobile device and the CDMA network both keep track of the ICCID of the UICC card. To do this end, the mobile device includes a file or a database that keeps an association between the mobile device's ID (e.g., IMEI/MEID) and the ICCID. Once the device dials *228 to be provisioned, the ICCID and the mobile device's ID are forwarded to the CDMA network. As such, the CDMA recognizes the particular UICC card that is being used on the mobile device and stores this association within its database.

Thereafter, when the user changes the UICC card of the mobile device, the mobile device recognizes that the ICCID of the newly inserted UICC card does not match the one stored in its internal database. In this manner, the mobile device realizes that this is a new UICC card, which is associated with new credentials. The mobile device informs the user of the mismatch/new credential condition and requests that the user either inserts a correct UICC card or provision the mobile device for the newly inserted UICC card. If the user chooses to provision the device for the newly inserted UICC card, the mobile device prompts the user to enter a PIN. The PIN may include an account number or a secret password or information that is only known to the owner of the device/account. The PIN can be administered through a web interface (e.g., Verizon Wireless™ webpage) in case the user forgets or accidentally locks the UICC card. To illustrate, in one example, the webpage may solicit identification information from the user who has forgotten his/her PIN to authenticate the user. Upon successful authentication, the user is provided with the new PIN. The new PIN may be downloaded securely to the UICC card. In one example, for better user experience, the PIN entry can be overcome by an internal comparison of the PIN stored in the UICC with the one administered through the web interface, without asking the user to key in the PIN.

In one implementation, the PIN is associated with the credentials previously stored in the mobile device. In this scenario, the user associated with the credentials previously stored in the mobile device can authorize the provisioning of the mobile device for the newly inserted UICC card. In another implementation, the PIN is associated with the account of the newly inserted UICC card. As such, the user associated with the account of the newly inserted UICC card can authorize the provisioning of the mobile device for the newly inserted UICC card. The newly inserted UICC card may include, for example, credential information necessary to authenticate the PIN received from the user. To this end, the mobile device compares the PIN received from the user with the one stored on the newly inserted UICC card and based on the result of the comparison determines whether to provision the device for the newly inserted UICC card. Another approach would be to communicate with the network to implement the challenge and PIN or password authentication as against account data stored in the network, although the account could be that associated with the previously stored credentials or an account associated with the newly inserted UICC.

The comparison such as PIN and ICCID against MEID can either be executed in the device or in the UICC card. If the user-provided PIN matches, then the mobile device forwards the ID of the newly inserted UICC card to the CDMA network and receives from the network the credentials pertaining to the newly inserted UICC card. The network updates its database accordingly, provisions the new device with the right user credentials, and grants access to the mobile device. However, if the PIN does not match the credentials associated with the newly inserted UICC card, then no access is granted on the CDMA network. Of course, if the device moves to the LTE network, the device can continue its operation. In one implementation, the mobile device that previously included the newly inserted UICC card is deactivated until it receives a new UICC card and is properly provisioned for the new UICC card. The device from which the UICC card was removed shall not work on CDMA network until a correct UICC card is inserted into it. This ensures that the device only works in one mode, which has the right UICC card.

In this manner, the scenario in which the subscriber account ends up being associated with both of two otherwise different mobile devices is avoided. With this overview, it is helpful to first describe in detail how a dual mode mobile device can be provisioned while operating in different networks and then describe what happens when the provisioned dual mode mobile device receives a new UICC card.

Figure 1:
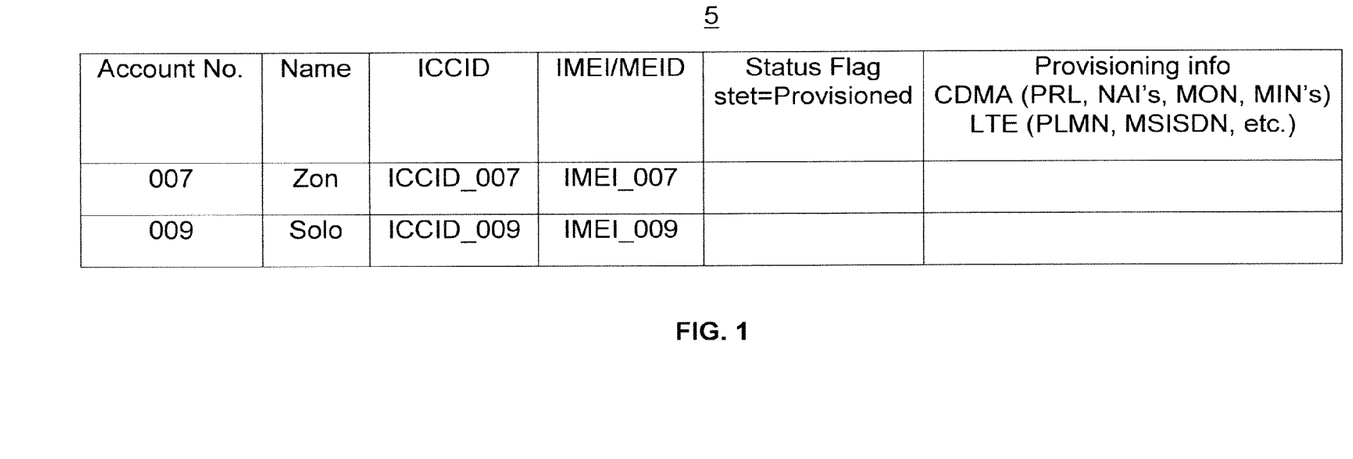
FIG. 1 illustrates an exemplary database that stores information about multiple subscriber accounts.

FIG. 1 illustrates an exemplary database 100 that stores information about first and second dual-mode devices. The two entry table and the data in the table entries are given here by way of a simple example useful in explaining the present concepts. The table may be stored in the CDMA network and may include two accounts, each for a different dual-mode mobile device. An actual database, of course, would include listings or entries for many devices or accounts, and there may be more data stored for each account or device. As shown, the table includes a first account 007 associated with one dual-mode mobile device and a second account 009 associated with another dual-mode mobile device. The first account includes account number 007 and is associated with user Zon. The dual-mode mobile device associated with this account includes a UICC chip ID of ICCID_007 and a device ID of IMEI_007.

The second account includes account number 009 and is associated with user Solo. The dual-mode mobile device associated with this account includes a UICC chip ID of ICCID_009 and a device ID of IMEI_009. Since both of the mobile devices include a valid UICC chip they can operate in the LTE network. As shown in the table 100, however, neither of the devices can operate in the CDMA network since they have not yet been provisioned for complete access to CDMA network. As such, they do not yet include CDMA provisioning information in table 100.

The methodology to provision a mobile device while it is operating in one network may be different than provisioning the same device while it is operating in another network. To illustrate, in a CDMA only network, upon boot up the device checks to see if there is any previous reference of UICC stored in its memory. It is assumed that the device is new with no credentials. As such, there should be no previous reference to UICC.

Moving forward, the device recognizes the UICC operating on it and in order to keep track of it stores the ICCID of the UICC card in its internal database. In keeping with a previous example, the device associated with account number 007 will store ICCID_007 in its memory, whereas the device associated with account number 009 will store ICCID_009 in its memory.

To provision the device in the CDMA network, the device sends its IMEI/MEID to the CDMA network. In one example, the user connects to a computer and selects a connect option on, for example, Verizon Wireless Access Messenger, assuming that the CDMA network is the Verizon CDMA network. As a result, the device sends the IMEI to the network for provisioning the device as usual. The computer also sends the ICCID to the network for registering the device to the IMEI/MEID. As a result, the network associates the ICCID to the IMEI in its database.

In keeping with the previous example, the device associated with account number 007 sends ICCID_007 and IMEI_007 to the CDMA network upon connecting thereto via the air interface. The CDMA network receives the ICCID_007 and IMEI_007 and associates the ICCID_007 with the IMEI_007. Similarly, the device associated with account number 009 sends ICCID_009 and IMEI_009 to the CDMA network. The CDMA network receives the ICCID_009 and IMEI_009 and associates the ICCID_009 with the IMEI_009.

Figure 2:
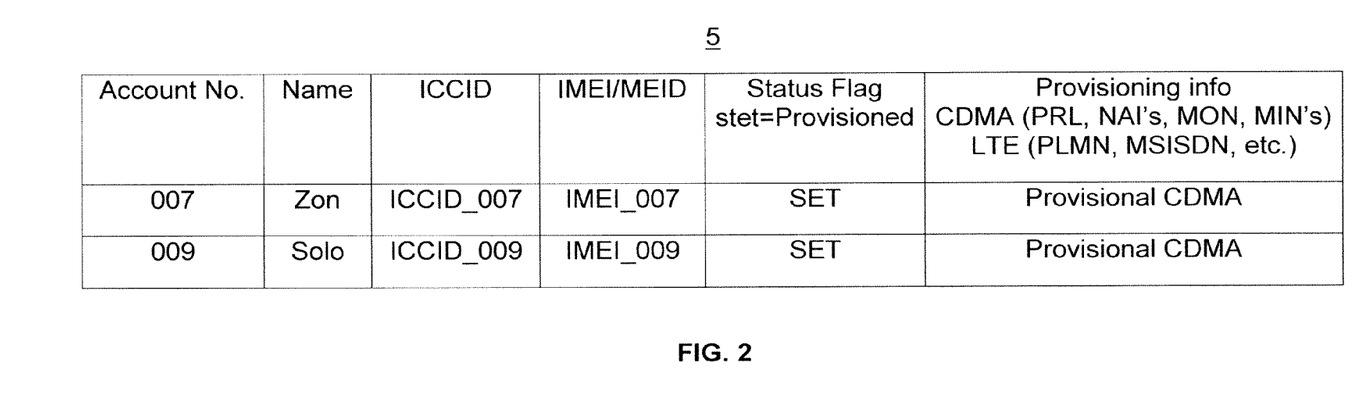
FIG. 2 illustrates the exemplary database shown in FIG. 1 which has been updated to indicate that each subscriber account has been provisioned to access the CDMA network.

FIG. 2 illustrates the exemplary database 100 which has been updated to reflect that each subscriber account has been provisioned to access the CDMA network. As shown, the set flag column indicates that the mobile device associated with account number 007 is provisioned and the provisioning information column indicates the network in which the mobile device is provisioned in, namely, the CDMA network. Similarly, for account number 009, the set flag column indicates that the dual mobile device is provisioned and the provisioning information column indicates that the mobile device is provisioned in the CDMA network. For each account, the database 100 also illustrates that there is an association between the mobile device ID and the UICC chip operating on the mobile device.

Provisioning the device in CDMA and LTE network is slightly different than provisioning the device in the CDMA only network. Similar to provisioning steps in the CDMA network, on boot up the device checks to see if there is a previous reference of UICC stored in its memory. Since the device is a new device, it likely includes no such reference. The device identifies the ICCID of the UICC card operating on it and stores this ID into its memory. In keeping with a previous example, the device associated with account number 007 stores ICCID_007 in its memory. The device associated with account number 009 stores ICCID_009 in its memory.

Since the mobile device receives communication services from the LTE network the user is granted access right away. Since the device also receives communication services from the CDMA network, in the background, the device sends the ICCID and the IMEI to the CDMA network. The CDMA network uses the IMEI to provision the device as usual. The CDMA network also registers that ICCID to the IMEI of the device. In keeping with the previous example, the device associated with account number 007 sends ICCID_007 and IMEI_007 to the CDMA network. The CDMA network receives the ICCID_007 and IMEI_007 and associates the ICCID_007 to the IMEI_007. Similarly, the device associated with account number 009 sends ICCID_009 and IMEI_009 to the CDMA network. The CDMA network receives the ICCID_009 and IMEI_009 and associates the ICCID_009 to the IMEI_009. In this manner, the CDMA network tracks the UICC card that is operating on each mobile device.

Provisioning the device on the LTE only network is slightly different from provisioning the dual-mode mobile device on the CDMA only network or the LTE and CDMA network. Similar to the provisioning steps in the CDMA network, on boot up the device check to see if there is any previous reference of UICC stored in its memory. Since the device is a new device, it stores the value of the ICCID inserted therein into its memory. In keeping with a previous example, the device associated with account number 007 will store ICCID_007 in its memory. The device associated with account number 009 will store ICCID_009 in its memory.

Since the device is in the LTE network, the access is granted right away and the device is ready to go. To be provisioned in the CDMA network, however, the user may have to send its credentials to the CDMA network. Since the device only receives communication services from the LTE network and not in the CDMA network, the device tracking application informs the database to set a flag to provision the device for CDMA when CDMA becomes available. When the CDMA does become available, in the background, the device sends the ICCID and its IMEI to the CDMA network and the network associates the ICCID with the IMEI of the device in a manner described above with respect to FIG. 2.

As pointed out above, once the UICC card is inserted in the device the device keeps tracks of the ID (e.g., ICCID) associated with the UICC card. In the process of being provisioned the device sends this ID to the CDMA network to inform the network of the UICC card that the device is using or for which it is being provisioned. The CDMA network also updates its database to associate the UICC ID with the device (e.g., with the IMEI of the device). In the CDMA network, when the user changes UICC card of the device, the device references its database and recognizes the mismatch between the new UICC card ID and the previous UICC card ID stored in memory in the device.

The device informs the user of the mismatch and requests the user to either insert the previous UICC card or provision the phone for the newly inserted UICC card. For example, the device may display to the user "for connectivity please insert the correct UICC or would you like to provision this device for your credentials." If the user chooses to provision the device for the newly inserted UICC card, the device prompts the user to enter a PIN that is known to the subscriber and the network. The PIN may include an account number and/or a secrete password.

In one implementation, the PIN is associated with the credentials previously stored in the mobile device. In this scenario, the user associated with the credentials previously stored in the mobile device can authorize the provisioning of the mobile device for the newly inserted UICC card. In another implementation, the PIN is associated with the account of the newly inserted UICC card. As such, the user associated with the account of the newly inserted UICC card can authorize the provisioning of the mobile device for the newly inserted UICC card. The newly inserted UICC card may include, for example, credential information necessary to authenticate the PIN received from the user. In another implementation, the credential information necessary to authenticate the PIN received from the user may be stored in the network. To this end, the mobile device may communicate with the network to implement the challenge and PIN or password authentication as against account data stored in the network. The account could be that associated with the previously stored credentials or an account associated with the newly inserted UICC.

In either case, the mobile device compares the PIN received from the user with the credentials associated with the newly inserted UICC card and based on the result of the comparison determines whether to provision the device for the newly inserted mobile device. If the password matches, then the device forwards the ID of the newly inserted UICC card to the CDMA network and receives from the network the credentials pertaining to the newly inserted UICC card. The network updates its database accordingly. However, if the PIN does not match the credentials associated with the newly inserted UICC card, then no access is granted on the CDMA network. Of course, if the device moves to a different network (e.g., LTE network), the device will work in that network.

To illustrate further and in keeping with previous examples, assume that the user is in the CDMA network and decides to remove the UICC card including ICCID_007 from the dual mode mobile device associated with account number 007 and in its place inserts the UICC card having ICCID_009 associated with account number 009. In this scenario, upon boot up the device compares the ICCID value with the one stored in the device and recognizes the mismatch. The device may recognize the mismatch by referencing an internal table that includes the ICCID of the UICC card for which the device is provisioned.

Upon recognizing the mismatch, the device informs the user of the same and requests the user to either insert the previous UICC card (e.g., UICC having ICCID_007, hereinafter "UICC card 007") or provision the device for the newly inserted UICC card (e.g., UICC having ICCID_009, hereinafter "UICC card 009"). If the user chooses to provision the phone for UICC card 009, the user is prompted to enter a PIN. If the PIN matches with the credential stored on the device, then ICCID_009 is sent to the network and the credentials pertaining to ICCID_009 is provisioned in this device. The network also updates its database to reflect in account 007 that ICCID_009 is now associated with IMEI_007.

Similarly, the network also updates its database to reflect in account entry 009 that no ICCID_009 is associated with IMEI_009. As such, account 009 is temporarily deactivated until another device receives a new UICC card associated with the account 009 and can be provisioned in the CDMA network.

In another scenario, when the user is in an area with overlapping CDMA and LTE network coverage, and the user changes the UICC card of the device, on boot up the device compares the ICCID value of the newly inserted UICC card with the one stored in its database and recognizes the mismatch between them. If the device is connecting to the LTE network, however, the access is granted right away even though there is a mismatch between the devices and no further changes may be made to the device. This is because in the LTE network the credentials are transferred from one device to another via the UICC card. The UICC provides the credentials regardless of any other credentials that may be stored on in the device.

If connecting to the CDMA network, however, the device informs the user of the mismatch and requests the user to either insert the previous UICC card or provision the phone for the newly inserted UICC card. For example, the device may display to the user "for connectivity please insert the correct UICC or would you like to provision this device for your credentials." If the user chooses to provision the device for the newly inserted UICC card, the device prompts the user to enter a PIN. If the user-entered PIN matches with the PIN on the device, then the device forwards the ID of the newly inserted UICC card to the CDMA network and receives from the network the credentials pertaining to the newly inserted UICC card. The network updates its database accordingly. However, if the PIN does not match the credentials associated with the newly inserted UICC card, then no access is granted on the CDMA network.

In yet another scenario, when the user is in only the LTE network and changes the UICC card of the device, on boot up the device compares the ICCID value of the newly inserted UICC card with the one stored in its database and recognizes the mismatch between them. However, since the device is connecting to the LTE network, the access is granted right away and no further changes to the device may be necessary. This is because in the LTE network the credentials are transferred from one device to another via the UICC card, as noted in the CDMA and LTE example.

If the device later on moves to the CDMA network, due to the mismatch between the ICCID of the newly inserted UICC and the ICCID stored in the device's database, the device requests the user to either insert the previous UICC card or provision the device for the newly inserted UICC card in a manner described above. If the user chooses to provision the device for the newly inserted UICC card, the device prompts the user to enter a PIN. Upon successful authentication, the device forwards the ID of the newly inserted UICC card to the CDMA network and receives from the network the credentials pertaining to the newly inserted UICC card. The network updates its database accordingly. However, if the PIN does not match the credentials associated with the newly inserted UICC card, then no access is granted on the CDMA network.

Figure 3:
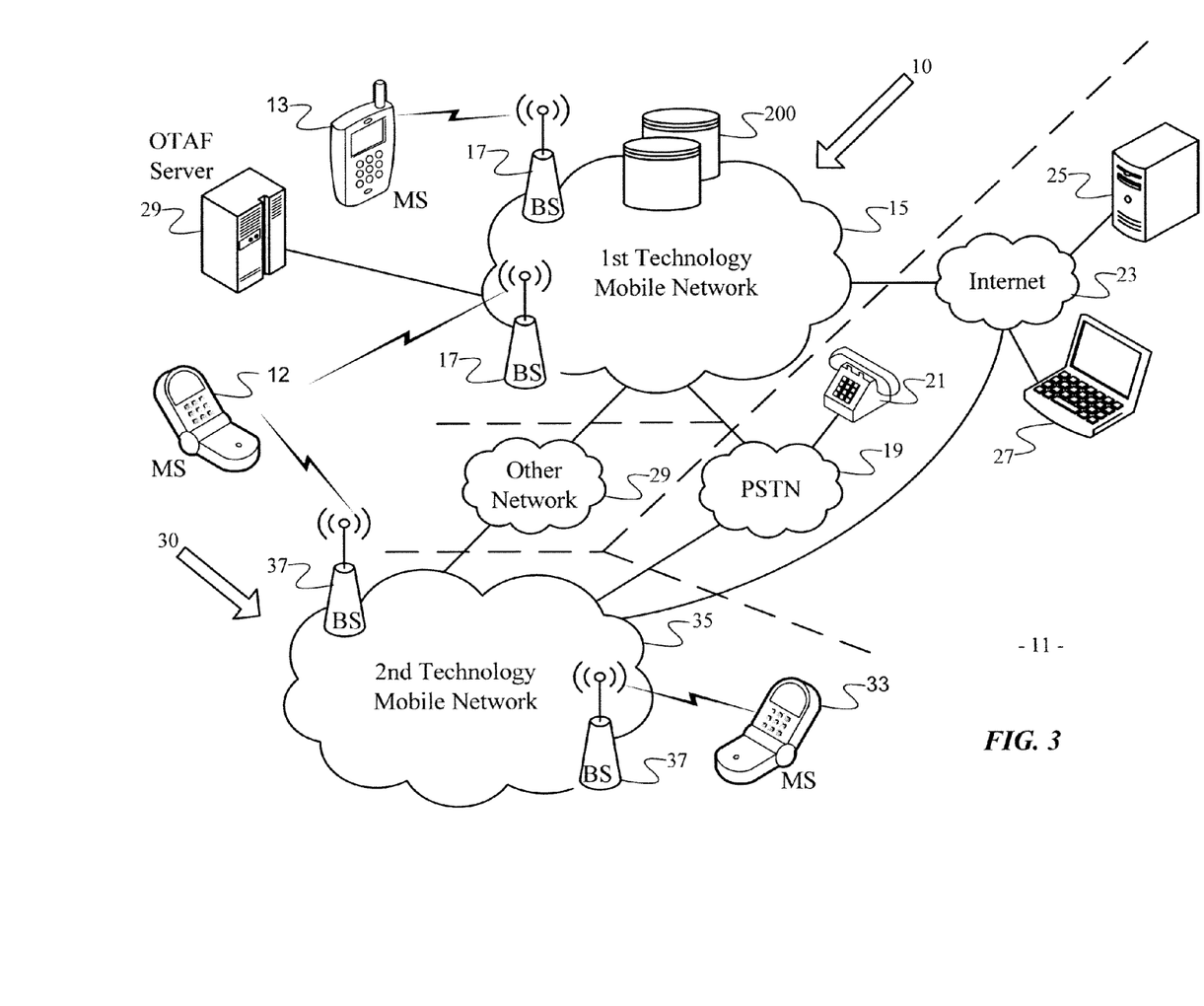
FIG. 3 is a high level functional block diagram, useful in explaining mobile devices, network elements and other components that may be involved in mobile device communications and related system selection functions.

FIG. 3 is a functional block diagram of an exemplary system of wireless networks for providing mobile voice telephone services and various data services. For discussion purposes, the diagram shows two wireless networks 10 and 30 operated in accord with different technology standards. The networks 10 and 30 often (but not always) may be operated by different providers, carriers or operators. The communication networks 10 and 30 implementing the illustrated system provide mobile voice telephone communications as well as other services such as text messaging and various multimedia packet data services, for numerous mobile devices. For purposes of later discussion three mobile devices 12, 13 and 33 appear in the drawing.

The elements indicated by the reference numerals 10 and 30 generally are elements of the respective operator's network, although the mobile devices 12, 13 and 33 typically are sold to the carrier's customers. Today, mobile devices typically take the form portable handsets, smart-phones or personal digital assistants, data cards for computers, although they may be implemented in other form factors. Each mobile communication network 10 or 30 provides communications between mobile devices 12, 13 and 33 as well as communications for the mobile devices with other networks and devices shown generally at 11 outside the mobile communication networks. An inter-carrier or other intermediate network 29 may provide communication connectivity between the mobile communication networks 10 and 30.

Each network 10 and 30 allows users of the mobile devices operating through the respective network to initiate and receive telephone calls to each other as well as through the public switched telephone network (PSTN) 19 and telephone stations 21 connected thereto. One or both of the networks typically offers a variety of text and other data services, including services via the Internet 23, such as downloads, web browsing, e-mail, etc. via servers shown generally at 25 as well as message communications with terminal devices represented generally by the personal computer 27.

The networks 10 and 30 are generally similar, except in our example, they offer respective services via two different wireless communication technologies. For purposes of an example for discussion here, we will assume that the network 10 is a CDMA technology network, whereas the network 30 is an LTE technology network.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile device 13 will typically include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 typically comprises a base transceiver system (BTS) which communicates via an antennae system at the site of base station and over the airlink with one or more of the mobile devices 13, when the mobile devices are within range. The BTS is the part of the radio network that sends and receives RF signals to/from the mobile devices that the base station currently serves. Hence, in our example, the BTS would utilize CDMA type transceiver equipment and implement communications in accord with the protocols of the applicable 3GPP2 standard, for signaling, registration, voice communication, data communication, etc. For example, each base station 17 will broadcast certain standardized information to allow a mobile device 12 or 13 in the region to search for, find and lock-onto the base station 17 and acquire information needed to register and initiate communications via the network 10, all in accord with the standard 3GPP2 protocols.

The radio access networks also include a traffic network represented generally by the cloud at 15, which carries the user communications for the mobile devices 12, 13 between the base stations 17 and other elements with or through which the mobile devices communicate. Individual elements such as switches and/or routers forming the traffic network 15 are omitted here for simplicity. Although not separately shown, the network 15 will include or connect with a number of service control elements, for authenticating mobile devices to use the network 10, for authenticating mobile device users and/or for authorizing users or devices to access various services and service features offered by the particular network 10, and for usage accounting and billing functions. At least some of the authentication functions and/or authorization functions require credentials information from the mobile devices, from time to time.

The traffic network portion 15 of the mobile communication network 10 connects to a public switched telephone network 19. This allows the network 10 to provide voice grade call connections between mobile devices and regular telephones connected to the PSTN 19. The drawing shows one such telephone at 21. The traffic network portion 15 of the mobile communication network 10 also connects to a public packet switched data communication network, such as the network commonly referred to as the "Internet" shown at 23. Packet switched communications via the traffic network 15 and the Internet 23 may support a variety of user services through the network 10, such as mobile device communications of text and multimedia messages, e-mail, web surfing or browsing, programming and media downloading, etc. For example, the mobile devices may be able to receive messages from and send messages to user terminal devices, such as personal computers, either directly (peer-to-peer) or via various servers 25. The drawing shows one user terminal device as a personal computer (PC) at 27, by way of example.

The carrier or service provider that operates the network 10 will also operate a number of systems that provide ancillary functions in support of the communications services provided through the network 10, and those elements communicate with other nodes/elements of the network 10 via one or more private IP type packet data networks or Intranets (not separately shown). Such systems maintain various records used for authentication and authorization functions and provisioning necessary information into the mobile devices to enable the devices to operate via the network 10. Of note for purposes of the present discussion credential management function, one or more such systems provide the capability to receive and store credential information and download provisioning into the mobile devices of the network operator, in this example, via the networks. These systems may also support downloading of the executable programming for credential management, to initially install such programming in the mobile devices or to fix or update the programming in the mobile devices over time. An example of such a system that may facilitate such operations via the networks is the Over-The-Air service activation/provisioning Function (OTAF) 28. In the example, the OTAF 28 may be a server connected to the traffic network 15, to enable the server to communicate with the mobile devices of the network operator's customers.

As noted earlier, many mobile wireless communications networks have been deployed and are available today. For purposes of discussion, the example of FIG. 3 shows a second mobile network 30. In our example, the network 30 is operated by a different carrier or service provider than the operator of network 10. In some areas, the second network 30 could utilize the same wireless technology as the network 10, but in our example, the network 30 utilizes a different wireless network technology. The network 10 is a CDMA technology network, and in the example, the network 30 is a LTE technology network.

Like the network 10, the physical elements of the radio access network (RAN) 30 include a number of base stations (BSs) 37, each of which includes a base transceiver system (BTS) and associated antenna system. In our example, each BTS of a base station 37 would utilize LTE type transceiver equipment and implement communications in accord with the protocols of the applicable 3GPP standard, for signaling, registration, voice communication, data communication, etc. For example, each base station 37 will broadcast certain standardized information to allow a mobile device 12 or 33 in the region to search for, find and lock-onto the base station 37 and acquire information needed to register and initiate communications via the network 30, all in accord with the standard LTE protocols.

The radio access network portions of network 30 also include a traffic network represented generally by the cloud at 35, which carries the user communications for the mobile devices 12, 33 between the base stations 37 and other elements with or through which the mobile devices communicate. Individual elements such as switches and/or routers forming the traffic network 35 are omitted here for simplicity. Although not separately shown, the network 35 will include or connect with a number of service control elements, for authenticating mobile devices to use the network 30, for authenticating mobile device users and/or for authorizing users or devices to access various services and service features offered by the particular network 30.

Similar to network 10, the traffic network portion 35 of the mobile communication network 30 connects to a public switched telephone network 19, to offer voice grade telephone call connections between mobile devices and regular telephones 21 connected to the PSTN 19. The traffic network portion 35 of the mobile communication network 30 also connects to a public packet switched data communication network, such as the network commonly referred to as the "Internet" shown at 23, for various mobile device communications with servers 25 and/or user terminal devices 27. Although omitted for simplicity, the network 30 may also include various systems that provide ancillary functions in support of the communications services provided through the network 30, such as a system similar to the OTAF 29 provisioning the mobile devices of the network operator's customers.

In keeping with the previous examples, mobile devices 12, 13, and 33 have dual mode capability to utilize both CDMA and LTE technology networks. Each mobile device may include a database that associates a particular UICC to the mobile device. The CDMA network also may include a database that associates a particular UICC to the mobile device. As such, the device can recognize when its UICC is changed and limit the access of the user in the CDMA network based on such recognition.

For example and referring also to FIG. 1, assume that mobile device 13 is associated with account 007 and the mobile device 12 is associated with account 009. As such, mobile device 13 includes a database that associates CCID_007 with the IMEI_007 and mobile device 12 includes a database that associates CCIC_009 with IMEI_009. The CDMA network may also include a similar database as shown in FIG. 1. Now, if the user of mobile device 13 changes its UICC card (hereinafter "UICC card 007") with UICC card of mobile device 12 (hereinafter, "UICC card 009"), mobile device 13 recognizes the mismatch between the CCID_009 and CCID_007 stored in its database and informs the user of the same.

The mobile device 13 requests the user to either insert UICC card 007 or provision the phone for the newly inserted UICC card 009. For example, the device may display to the user "for connectivity please insert a cored UICC card or would you like to provision this device for your credentials." If the user inserts UICC 007, the user is granted access on CDMA network 15. If, however, the user chooses to provision the device for UICC card 009, the device prompts the user to enter a PIN. The PIN may include an account number or a secrete password. If the password matches, then the device forwards the ICCID_009 to the CDMA network 15 and receives from the network 15 the credentials pertaining to ICCID_009.

The CDMA network 15 updates its database accordingly and grant access to mobile device 13. That is, the CDMA network 15 updates table 100 to reflect that in account 007 ICCID_009 (instead of ICCID_007) is now associated with the IMEI_007. Furthermore, the CDMA network 15 updates table 100 to erase the association between ICCID_009 and the IMEI_009. As such, mobile device 12 cannot use the CDMA network 10 or the LTE network 33 since it does not include a valid UICC. To communicate on the LTE and CDMA networks, mobile device 12 will require a valid UICC (e.g., UICC card 007).

In one implementation the CDMA table 100 may be stored in database 200. The database 200 generally stores credentials (e.g., MIN, MDN, PRL) associated with mobile devices 12, 13, and 33 and may be used/modified by various elements of the network, from time to time. For example, the CDMA network may update the table to reflect new association formed for each mobile device when the UICC card of the mobile device is changed. Some or all of the credential information is populated into storage in or associated with various device control elements of the network 15 for use in actual authentication and authentication operations.

If the user inserts the UICC card 007 inside mobile device 12, then similar to the above scenario, mobile device 12 recognizes the mismatch between its internal ICCID_009 and the ICCID_007 associated with UICC card 007. Therefore, similar to the above-described scenario, mobile device 12 requests the user to either insert UICC card 009 or provision the phone for the newly inserted UICC card 007. If, however, the user chooses to provision the device for UICC card 007, the device prompts the user to enter a PIN. The PIN may include an account number or a secrete password. If the password matches, then the device forwards the ICCID_007 to the CDMA network 15 and receives from the network 15 the credentials pertaining to ICCID_007. At this point, mobile device 12 can use either CDMA network 15 or LTE network 33 to make a call.

The CDMA network 15 updates its database accordingly. That is, the CDMA network updates table 100 to reflect that in account 009 ICCID_007 (instead of ICCID_009) is now associated with the IMEI_009. Of course, if the inserted PIN does not match, the access to CDMA network 15 is denied to mobile device 13 and the table remains unchanged.

Figure 4:
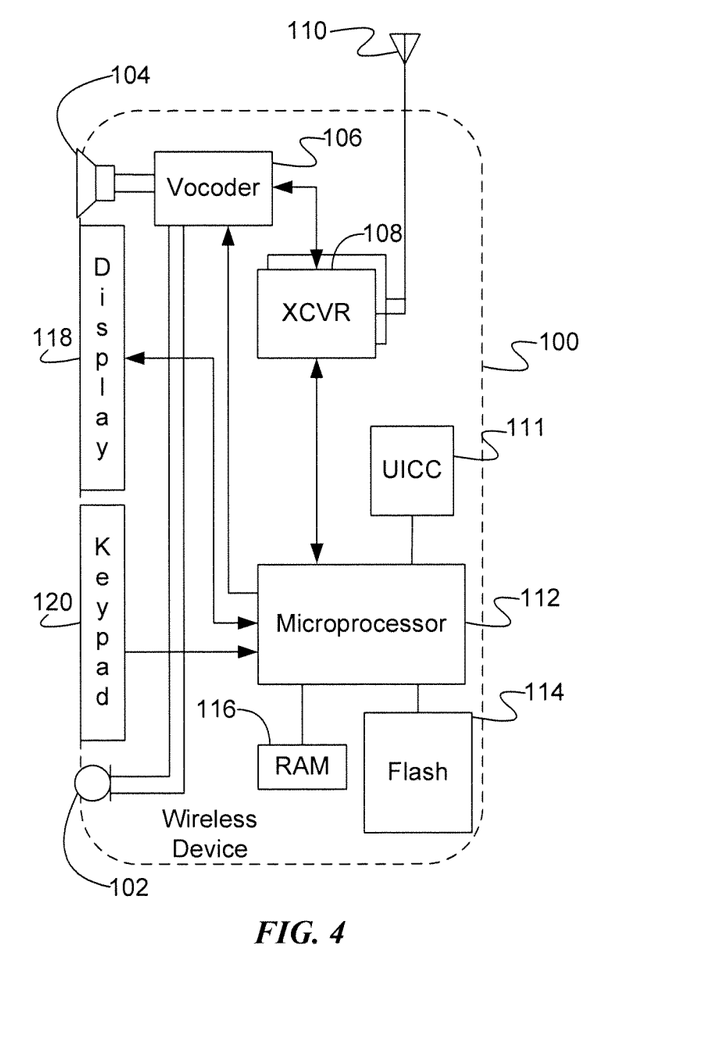
FIG. 4 is a high level functional block diagram of a handset type example of a mobile device describes with respect to FIGS. 1-3.

FIG. 4 provides a block diagram illustration of an exemplary wireless device 100, which may be the wireless device 12, 13 or 33 of a customer of any of the network operators. Although the wireless device 100 may be a smart-phone or may be incorporated into another device, such as a portable personal computer, personal digital assistant (PDA) or the like, for discussion purposes, the illustration shows the wireless device 100 in the form of a handset. The handset embodiment of the wireless device 100 functions as a normal digital wireless telephone station. For that function, the station 100 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 100 also includes at least one digital transceiver (XCVR) 108. The handset 100 is a multimode device capable of operations on various technology type networks, such as the networks 10 and 30. For example, the handset 100 may utilize either or both of 3GPP2 (1XRTT and EVDO) technologies and 3GPP (LTE/GSM/UMTS) technologies. For that purpose, the transceiver (XCVR) 108 could be a multimode transceiver, or the handset 100 may include two or more transceivers each of which supports a subset of the various technologies or modes. The concepts discussed here encompass embodiments of the station 100 utilizing any digital transceivers that conform to current or future developed digital wireless communication standards.

The transceiver 108 provides two-way wireless communication of information, such as vocoded speech samples and/or digital message information, in a selected one of the technology modes. The transceiver 108 also sends and receives a variety of signaling messages in support of the various voice and data services provided via the station 100 and the communication network (described earlier with regard to FIG. 3). Each transceiver 108 connects through RF send and receive amplifiers (not separately shown) to an antenna 110. In the example, the transceiver 108 is configured for RF communication in accord with a digital wireless protocol, such as the current 3GPP2 and 3GPP protocols. For the network selection function, network communications via the transceiver 108 and antenna 110 detect the available network technology types in any given service area and select an available network accordingly.

The station 100 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during a system selection operation or during a selection software download operation. Various combinations of the keypad 120, display 118, microphone 102 and speaker 104 may be used as the physical input output elements of the GUI, for multimedia (e.g. audio and/or video) communications. Of course other user interface elements may be used, such as a stylus and touch sensitive display screen, as in a PDA or smart phone.

A microprocessor 112 serves as a programmable controller for the wireless device 100, in that it controls all operations of the wireless device 100 in accord with programming that it executes, for all normal operations, and for operations involved in tracking the UICC on the mobile device. In the example, the wireless device 100 includes flash type program memory 114, for storage of various "software" or "firmware" program routines and mobile configuration settings, such as mobile directory number (MDN) and/or mobile identification number (MIN), and ICCID number, etc. The wireless device 100 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Provisioning related programming is part of the basic programming typically stored in the flash type program memory 114, sometimes referred to as "firmware," is loaded into and executed by the microprocessor 112.

The executable provisioning program stored in the flash memory 114 may include a program for controlling credential management functions and for enabling the mobile device to keep track of its UICC card and does not authorize or restrict access to the CDMA network when the UICC card is replaced with a new UICC card. The flash memory 114 may also store CDMA credentials of associated with the subscriber, for example, so that a portion of the memory serves as a R-UIM module.

In a slightly different implementation, some or all of the provisioning program may be stored in UICC 111 instead of flash memory 114. 3GPP variants of the mobile devices often utilize UICC 111, which provides secure storage for various data needed for operation of a mobile device, such as data identifying the mobile device to the network (e.g. MDN and/or MIN). As discussed above, if the UICC 111 is changed on the device, the device recognizes this change and informs the user of the same. In particular, the device informs the user to either insert the correct UICC or to provision the device for the new UICC.

As shown by the above discussion, functions relating to enabling the mobile device to track its UICC card may be implemented on a mobile device in the form of programming. An example of the device has been discussed above relative to FIG. 4. The relevant software (programming and/or list data) may be downloaded and/or updated from a computer platform, for example, from an OTAF server or the like communicating with the mobile device via the network. Although special purpose devices may be used to support the provisioning and/or related download and update functions, such devices also may be implemented using one or more hardware platforms intended to represent a general class of data processing device commonly used to run "server" and/or "client" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the various technology and system or network selection lists. The programming code is executable by the microprocessor 112 of the mobile device, e.g. from storage in the flash memory 114. For downloading and installation, however, the software is stored within the general-purpose computer platform or the like serving as the OTAF system 29 running its own programming.

Figures 5, 6:
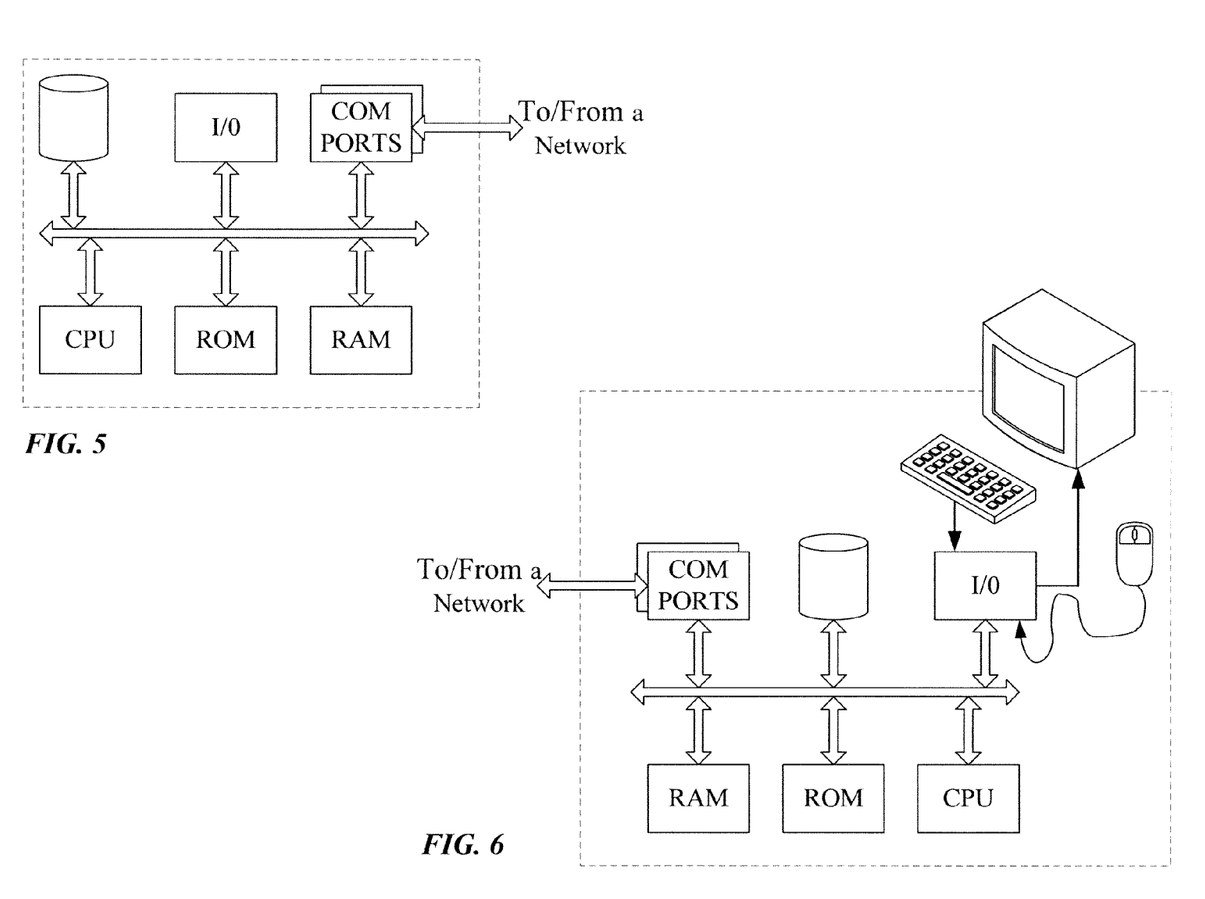
FIG. 5 is a simplified functional block diagram of a computer that may be configured as a host or server.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 5 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of network selection outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from a computer or processor into the mobile station, for example, from the OTAF server or other computer of the network operator into the mobile station(s) of the operator's customer(s). Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Other implementations are contemplated. For example, the attached Appendix A titled "Proposed Solution to Solve Device—UICC Swap" may describe additional implementations and provide additional information about the implementation thus far described. Although the instant application has been described in context of global devices that support 3GPP2 type CDMA technologies (1XRTT and EVDO) and 3GPP technologies (GSM/UMTS/LTE), it should be noted that the instant application can be applied to any dual-mode device that supports technologies other than the 3GPP2 type CDMA technologies as long as the dual-mode device supports the 3GPP technologies. For example, the instant application can by applied to a dual-mode device that is configured to support WiMax technologies and 3GPP technologies.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

1XRTT—One (1) times (x) Radio Transmission Technology
3GPP—Third (3rd) Generation Partnership Project
3GPP2—Third (3rd) Generation Partnership Project 2
ADPU—Application Protocol Data Unit
BS—Base Station
BTS—Base Transceiver System
CAT—Card Application Toolkit
CCAT—CDMA Card Application toolkit
CD—Compact Disk
CDMA—Code Division Multiple Access
CD-ROM—Compact Disk-Read Only Memory
CPU—Central Processing Unit
CSIM—CDMA Subscriber Identity Module
DVD—Digital Video Disk DVD-ROM—Digital Video Disk-Read Only Memory
EEPROM—Electrically Erasable Programmable Read Only Memory
EF—Elementary File
EPROM—Erasable Programmable Read Only Memory
EVDO—1x/Evolution—Data Only
GSM—Global System for Mobile Communications
ICCID—Integrated Mobile Equipment Identity
ID—IDentification
IMEI—International Mobile Equipment Identity
IMSI—International Mobile Subscriber Identity
IR—InfraRed
ISIM—IP Multimedia Services Identity Module
LTE—Long Term Evolution
MDN—Mobile Directory Number
MEID—Mobile Equipment Identifier
MF—Master File
MIN—Mobile Identification Number
OTAF—Over-The-Air Functionality
OTAPA—Over the Air Parameter Administration
OTASP—Over the Air Service Programming
PC—Personal Computer
PCS—Personal Communication Service
PDA—Personal Digital Assistant
PIN—Personal Identification Number
PRL—Preferred Roaming List
PROM—Programmable Read Only Memory
PSTN—Public Switched Telephone Network
RAM—Random Access Memory
RAN—Radio Access Network
RF—Radio Frequency
ROM—Read Only Memory
R-UIM—Removable-User Identity Module
SIM—Subscriber Identity Module
SMS—Short Message Service
SMS-PP—Short Message Service-Point to Point
UICC—Universal Integrated Circuit Card
UIM—User Identity Module
UMTS—Universal Mobile Telecommunications Systems
USAT—Universal SIM Application Toolkit
USIM—Universal Subscriber Identity Module
WAN—Wide Area Network
XCVR—Transceiver

What is claimed is:

1. A computer-implemented method comprising:
receiving subscriber data for a mobile device requesting access to a first type of network, the subscriber data including a device identifier for the mobile device and a first module identifier for a first removable module coupled to the mobile device, the mobile device having credentials for the first type of network stored in an internal memory of the mobile device, and the first removable module having credentials for a second type of network stored in a memory of the first removable module;
storing in a database an association between the device identifier of the mobile device and the first module identifier with previously stored information for a subscriber account associated with the mobile device; and
authorizing the mobile device to access the first type of network based on the stored association between the device identifier of the mobile device and the first module identifier, wherein the mobile device is granted authorization to access the first type of network only when subscriber data, received from the mobile device for subsequent access requests, includes module identifier information matching the first module identifier stored in association with the device identifier of the mobile device.

2. The method of claim 1, wherein the device identifier and the first module identifier are received, from the mobile device, as part of a request to access the first type of network.

3. The method of claim 1, wherein the device identifier is received, from the mobile device, as part of a request to access to the first type of network and the first module identifier is received, from another computing device of a user associated with the subscriber account, as part of a user process for registering the mobile device with the first type of network.

4. The method of claim 1, wherein the received subscriber data includes the credentials for the respective first and second types of network, the method further comprising:
determining whether the received credentials for the respective first and second types of network are valid based on the previously stored information for the subscriber account; and
provisioning the mobile device for the first type of network and the first module identifier only when the received credentials are determined to be valid.

5. The method of claim 1, wherein the first type of network is a Code Division Multiple Access ("CDMA") network and the device identifier is a unique mobile equipment identifier for identifying the mobile device in the CDMA network.

6. The method of claim 1, wherein the second type of network is a Third Generation Partnership Project ("3GPP") network, the removable module is a Subscriber Identity Module ("SIM") card and the first module identifier is a unique integrated circuit card identifier for identifying the SIM card in the 3GPP network.

7. The method of claim 1, further comprising:
receiving, from the mobile device, new subscriber data in a subsequent request to access the first type of network, the new subscriber data including the device identifier of the mobile device and a second module identifier of a second removable module coupled to the mobile device, the second removable module having new credentials stored for the second type of network;
upon determining the second module identifier does not match the first module identifier stored in association with the device identifier of the mobile device, authenticating the new credentials stored in the second removable module for the second type of network; and
updating the previously stored information in the database for the subscriber account associated with the mobile device so as to store the device identifier of the mobile device in association with the second module identifier, only when the new credentials are successfully authenticated.

8. The method of claim 7, further comprising:
authorizing the mobile device to access the first type of network based on the stored association between the device identifier of the mobile device and the second module identifier, wherein the mobile device is granted authorization to access the first type of network only when subscriber data, received from the mobile device for subsequent access requests, includes module identifier information matching the second module identifier stored in association with the device identifier of the mobile device.

9. The method of claim 7, wherein the authenticating step comprises:

initiating the mobile device to request, from a user of the mobile device, authentication information related to the new credentials stored in the second removable module; and upon receiving the requested authentication information, authenticating the new credentials based on the received authentication information and the previously stored information related to the subscriber account associated with the mobile device.

10. The method of claim 7, wherein the second module identifier was previously stored in association with a second device identifier of a second mobile device associated with a second subscriber account, and the updating step further comprises:

updating previously stored information in the database for the second subscriber account so as to remove the association between the second module identifier and the second device identifier; and subsequently preventing the second mobile device from accessing the first type of network.

11. A server comprising:

a network communication device configured to exchange data communications through a first type of network, the first type of network including at least one database accessible to the network communication device;

a processor coupled to the network communication device;

a storage device accessible to the processor; and an application program in the storage device, the application program including a plurality of functions, wherein execution of the application program by the processor configures the application server to exchange data communications related to the plurality of functions with a mobile device through the first type of network, wherein the processor is configured to perform functions, including functions to:

receive subscriber data for a mobile device requesting access to the first type of network, the subscriber data including a device identifier for the mobile device and a first module identifier for a first removable module coupled to the mobile device, the mobile device having credentials for the first type of network stored in an internal memory of the mobile device, and the first removable module having credentials for a second type of network stored in a memory of the first removable module;

store in the database an association between the device identifier of the mobile device and the first module identifier with previously stored information for a subscriber account associated with the mobile device; and authorize the mobile device to access the first type of network based on the stored association between the device identifier of the mobile device and the first module identifier, wherein the mobile device is granted authorization to access the first type of network only when subscriber data, received from the mobile device for subsequent access requests, includes module identifier information matching the first module identifier stored in association with the device identifier of the mobile device.

12. An article of manufacture, comprising a non-transitory computer-readable storage medium and a computer program for enabling a mobile device to access a first type of network, the computer program being embodied on the computer-readable storage medium and including instructions that, when executed, cause the mobile device to implement functions, including functions to:

upon receiving an initial indication of a first removable module being coupled to the mobile device, acquire a first module identifier from a memory of the first removable module coupled to the mobile device, the mobile device having credentials for the first type of network stored along with a device identifier of the mobile device in an internal memory of the mobile device, and the first removable module having authentication information associated with credentials for a second type of network stored with the first module identifier in the memory of the first removable module;

determine whether or not the acquired first module identifier matches module identifier information previously stored in association with the device identifier in the internal memory of the mobile device; and enable the mobile device to access the first type of network only when the first module identifier of the first removable module is determined to match the module identifier information previously stored in the internal memory of the mobile device.

13. The article of claim 12, wherein the enabling function implemented by the mobile device further includes functions comprising:

when the first module identifier acquired from the memory of the first removable module is determined not to match the previously stored module identifier information in the internal memory of the mobile device, request, from the user, authentication information for provisioning the mobile device for the first type of network and the first removable module;

upon receiving the requested authentication information from the user, determining whether or not the authentication information stored in the memory of the first removable module matches the authentication information received from the user;

send to the first type of network a provisioning request including the first module identifier of the first removable module and the device identifier of the mobile device, only when the authentication information stored in the memory of the first removable module is determined to match the authentication information received from the user;

receive from the first type of network the credentials for the second type of network, based on the provisioning request sent to the first type of network;

update the stored module identifier information at the mobile device so as to store the first module identifier of the first removable module in association with the device identifier of the mobile device in the internal memory of the mobile device; and store the received credentials for the second type of network in the memory of the first removable module coupled to the mobile device.

14. The article of claim 12, wherein the first type of network is a Code Division Multiple Access ("CDMA") network and the device identifier is a unique mobile equipment identifier for identifying the mobile device in the CDMA network.

15. The article of claim 12, wherein the second type of network is a Third Generation Partnership Project ("3GPP") network, the removable module is a Subscriber Identity Module ("SIM") card and the first module identifier is a unique integrated circuit card identifier for identifying the SIM card in the 3GPP network.

16. The article of claim 12, wherein the functions implemented by the mobile device further comprise functions to:

receive an initial indication of a second removable module being coupled to the mobile device, the second removable module having stored credentials for the second type of network;

responsive to the received initial indication of the second removable module at the mobile device, acquire a second module identifier for the second removable module; and upon determining that the second module identifier is not associated with the device identifier of the mobile device, request a user at the mobile device to provide the first removable module or authentication information related to the stored credentials for provisioning the mobile device for the second removable module.

17. The article of claim 16, wherein the functions implemented by the mobile device further comprise functions to:

disable access to the first type of network, when the authentication information provided by the user for provisioning the mobile device for the second removable module is determined to be invalid.

18. The article of claim 16, wherein the functions implemented by the mobile device further comprise functions to:

update the internal memory of the mobile device so as to associate the device identifier of the mobile device with the second module identifier of the second removable module, when the authentication information provided by the user for provisioning the mobile device for the second removable module is determined to be valid.

19. The article of claim 18, wherein the credentials for the second type of network stored in the second removable module was previously associated with a second device identifier for a second mobile device in the second type of network, and the second type of network is configured to remove the previous association between the second device identifier of the second mobile device and the second module identifier.

20. The article of claim 19, wherein the second type of network is configured to store a new association between the second device identifier of the second mobile device and the second module identifier.

* * * * *